T. R. KERR.
STREET SWEEPER.
APPLICATION FILED OCT. 29, 1909.

1,143,052.

Patented June 15, 1915.
5 SHEETS—SHEET 1.

T. R. KERR.
STREET SWEEPER.
APPLICATION FILED OCT. 29, 1909.

1,143,052.

Patented June 15, 1915.
5 SHEETS—SHEET 2.

Witnesses
J. H. Hinkel
J. N. Bruninga

Inventor
Thomas R. Kerr
By
Foster, Freeman, Watson & Coit
Attorneys

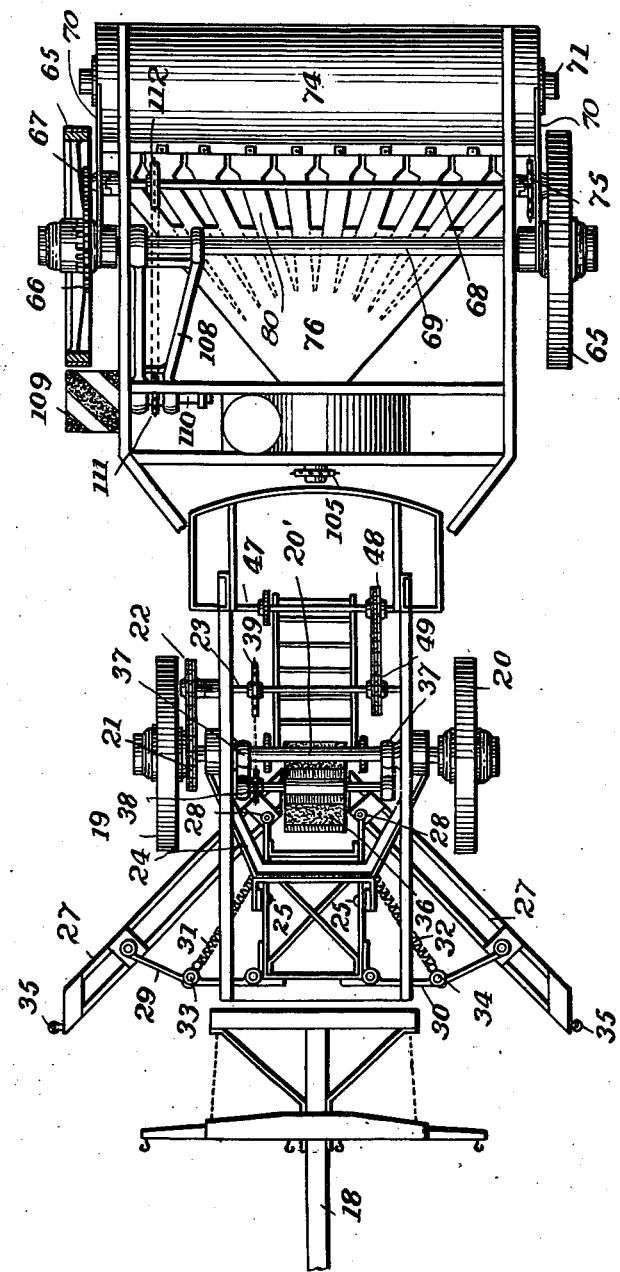

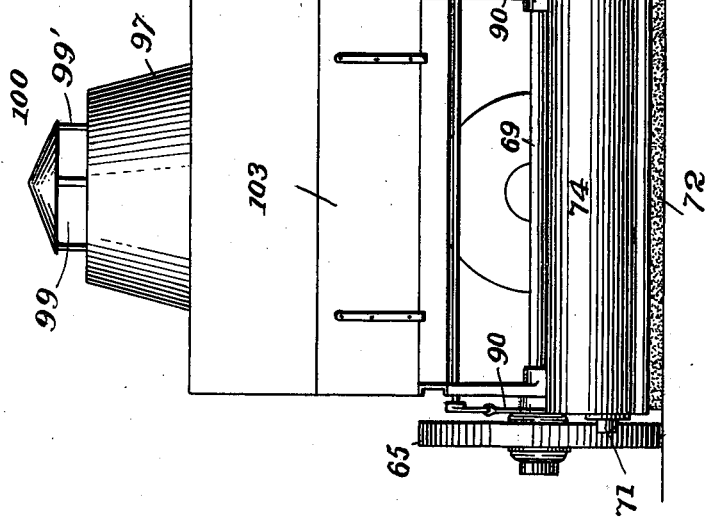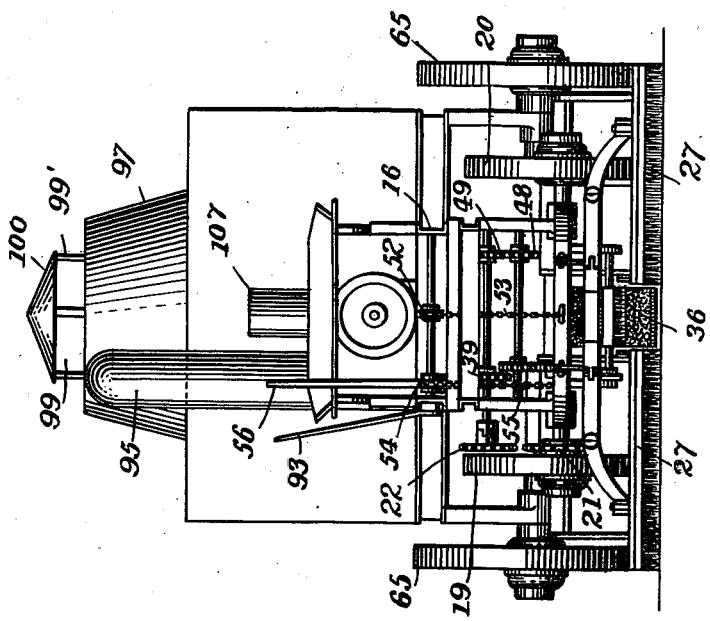

T. R. KERR.
STREET SWEEPER.
APPLICATION FILED OCT. 29, 1909.
1,143,052.
Patented June 15, 1915.
5 SHEETS—SHEET 5.
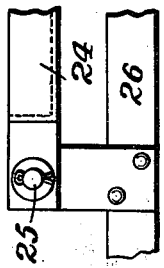
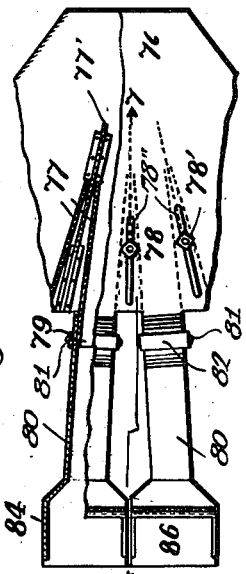
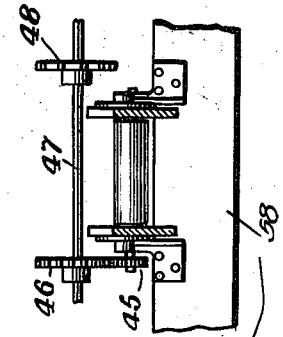
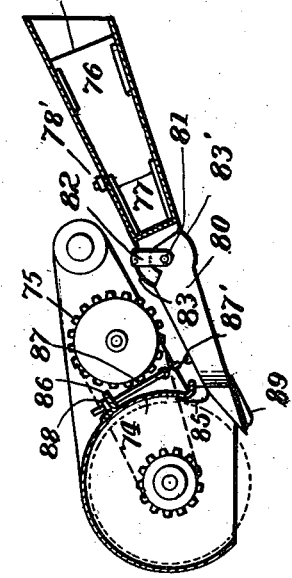
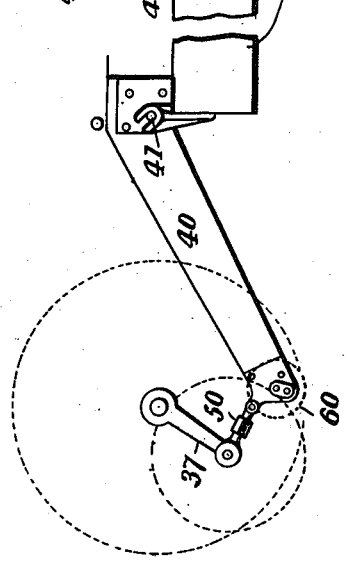
Witnesses
Inventor
Thomas R. Kerr
By Foster, Freeman, Watson & Co.
Attorneys

UNITED STATES PATENT OFFICE.

THOMAS R. KERR, OF NORFOLK, VIRGINIA.

STREET-SWEEPER.

1,143,052.  Specification of Letters Patent.  Patented June 15, 1915.

Application filed October 29, 1909. Serial No. 525,274.

*To all whom it may concern:*

Be it known that I, THOMAS R. KERR, a citizen of the United States, and resident of Norfolk, county of Norfolk, State of Virginia, have invented certain new and useful Improvements in Street-Sweepers, of which the following is a specification.

This invention relates to street sweepers. One of the objects of this invention is to provide an improved machine which will gather up the dirt and dust from the street and discharge them into a suitable receptacle.

Another object is to provide a machine having novel features whereby the collectors will adjust themselves automatically to the surface of the street and the curb line.

Another object is to provide improved means whereby the collectors may be raised from the street surface.

Another object is to improve the construction of the dust receiving receptacle.

Figure 1:
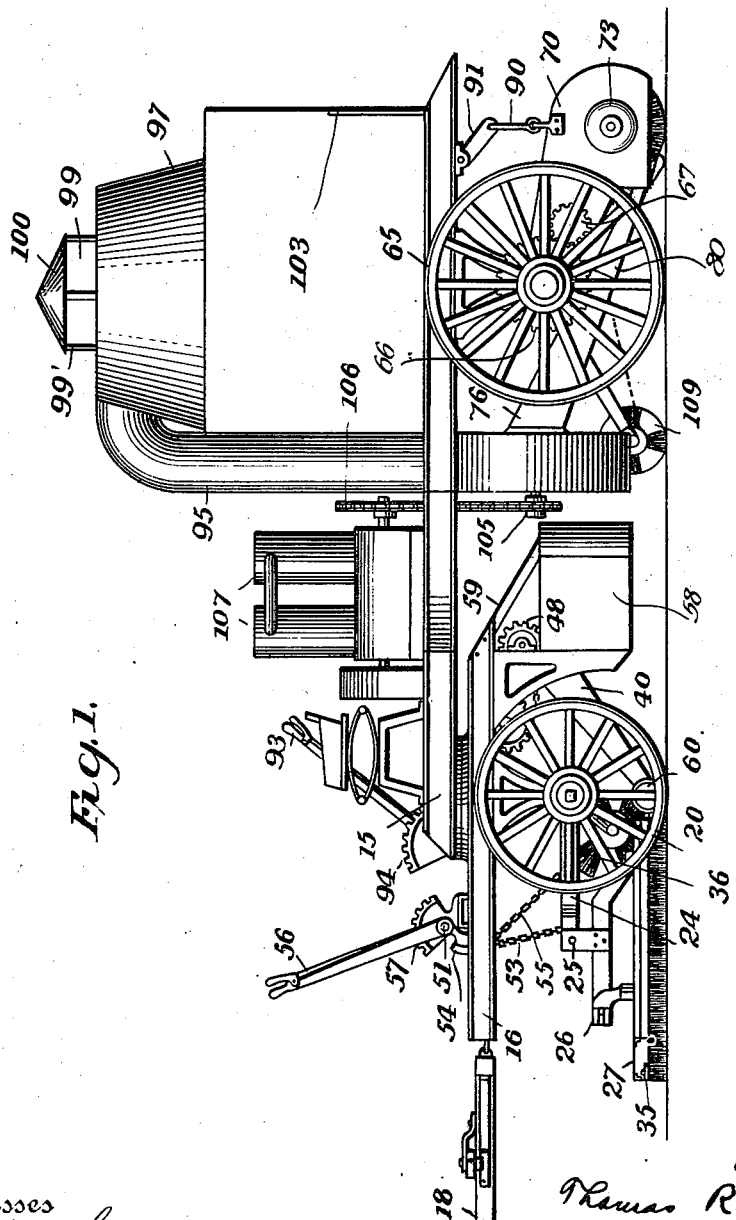
Figure 2:
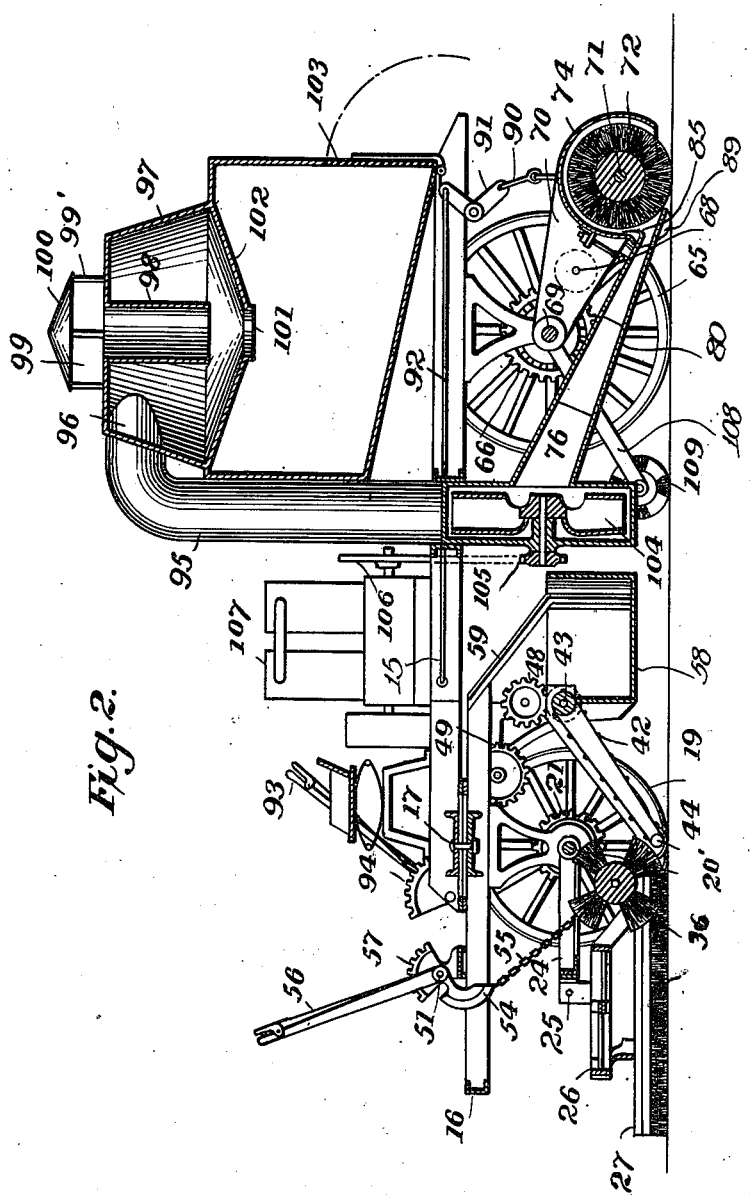

Other objects will appear from the detail description in connection with the accompanying drawings, in which, Figure 1 is a side elevation; Fig. 2 is a vertical longitudinal section; Fig. 3 is a plan view with some of the parts omitted; Fig. 4 is a front elevation; Fig. 5 is a rear elevation; Fig. 6 is a detail of the elevator and brush; Figs. 7 and 8 are details of the rear brush and the pneumatic dust collecting device; Fig. 9 is a detail of the elevator driving mechanism; Figs. 10 and 11 are details showing respectively, a side elevation and plan view of one of the pivotal connections between the front brush frame and its supporting frame.

Referring to the drawings, 15 designates a main frame formed of structural steel to which is pivotally connected the front frame 16 by means of a king bolt 17 and to this front frame is attached the usual tongue 18 by means of which the machine may be drawn by horses. The frame 16 is supported by road wheels 19 and 20 mounted upon an axle 20'. The wheel 19 has secured to it a sprocket wheel 21 which is connected to a sprocket wheel 22 on a shaft 23, by means of a chain. By this means the road wheel drives the shaft 23. A frame 24 is pivoted upon the axle 20' and pivoted to this frame by means of bolts 25 is a brush frame 26. Side brushes 27 are pivoted to the frame 26 at points 28. Pairs of toggle links 29 and 30 connect the outer ends of the brushes 27 with the frame 26 and springs 31, 32 connected to the frame 26 and the joints of the toggles 29 and 30 respectively normally tend to straighten the toggles and yieldingly move the side brushes 27 outwardly. Stops 33 and 34 at the toggle links limit the inward movement of the same and therefore the outward movement of the side brushes 27. A pair of anti-friction rolls 35 are mounted at the ends of the brushes 27 for a purpose hereinafter to be described.

A rotary brush 36 is supported in bearings on a brush frame comprising side members 37 pivotally mounted upon the axle 20'. A sprocket 38 is rigidly secured to the brush shaft and is driven from a sprocket 39 on the shaft 23 by means of a chain.

An elevator frame 40 is pivotally mounted upon the side of receptacle 58 by means of trunnions 41 supported in bearings thereon. An elevator 42 passes over rolls 43 and 44 mounted in said frame 40. The roll 43 is rigidly connected to a shaft which has secured to it a spur gear 45 meshing with the spur gear 46 on a shaft 47 journaled in bearings in the frame 16. The shaft 47 is driven from the shaft 23 by means of a chain passing over sprocket wheels 48 and 49 mounted upon the shafts 47 and 23 respectively. Adjustable links 50 connect the lower end of the elevator adjustably with the side members 37 of the brush frame. The length of these links is adjusted in a known manner by a turn buckle arrangement.

A shaft 51 is journaled in the frame 16 and has secured thereto a sector 52 to which is secured a chain 53 which passes over the sector and is secured to the frame 24. A second sector 54 is secured to the shaft 51 and a chain 55 attached to the sector and passing over the same is secured to one of the side members 37 of the brush frame. A lever 56 secured to the shaft 51 is adapted to rotate the same and is locked in adjusted position by means of a latch on the lever engaging recesses in the sector 57 on the frame 16.

The elevator 42 discharges into a receptacle 58 mounted on the frame 16 and this receptacle is provided with a cover 59. The lower end of the elevator frame 40 is provided with a pair of wheels 60 which support the lower end thereof.

The shaft 23 which is the main driving shaft is driven from the road wheel 19. In the specific construction shown in Fig. 3, the shaft 23 is driven only from the right hand wheel 19. The shaft 23 drives the rotary brush 36 and the elevator 42. The coarse dirt and refuse, as paper and stones, for instance, will be picked up by the side brushes 27 and moved toward their intersection and there received by the brush 36 which will pick them up and deliver them to the elevator 42 to be discharged into the receptacle 58. The side brushes 27 are moved yieldingly outwardly by means of the springs 31 and 32 and therefore the machine can be run alongside of the curb with one of the anti-friction wheels 35 bearing against the curb and the springs 31 and 32 allow the side brushes 27 to adjust themselves automatically to the curb line. The pivotal connections between the brush frames and the elevator and the frame 16 permit the brushes 27 and 36 and the elevator to adjust themselves automatically to the surface of the street. The brushes and the elevator may be raised at any time so as to clear the street by means of the operating lever 56. The adjustable link 50 permits a close adjustment between the elevator and the rotary brush 36.

The rear end of the frame 15 is supported by a pair of road wheels 65 which have secured thereto spur gears 66 meshing with gears 67 upon a main driving shaft 68. The wheels 65 are mounted upon an axle 69 passing through suitable bearings in the main frame. A rear brush frame comprising side members 70 is pivoted upon the axle 69 and receives a brush shaft 71 to which is secured the rear rotary brush 72. The side members are provided with bosses 73 forming bearings for the shaft 71. The rear brush 72 is inclosed by housing 74 supported by the side members 70, the shaft 68 has mounted upon it one or more sprocket wheels 75 which drive the brush shaft 71 by a chain or chains passing over the sprocket wheel or wheels 75 and a sprocket wheel or wheels mounted upon the shaft 71. These sprocket wheels 75 are mounted inside of the side members 70 so as to be protected.

The dust gathered up by the rotary brush 72 is received by a suitable suction device. A diverging suction head 76 is divided into a number of sections 78 by means of partitions 77. These partitions terminate in side extensions 79 which receive suction nozzles 80 secured thereto by rivets or bolts 81 which pivotally connect the suction nozzles with the suction head 76.

In order to regulate the suction in the nozzles I have provided means for varying the size of the passages connecting the sections 78 with the head 76, said means consisting of the plates 77' which slide between partitions 77 and are locked by nuts 78' on stems secured to the plates and projecting through slots 78'' in the head 76. The plates can, therefore, be adjusted from the outside and locked in position. The form of the suction nozzle is shown in Figs. 7 and 8. The connection between them is made air tight by means of top and bottom plates 83 and 83', plate 83' is sprung back for assembling and a clip 82 passes over the joint and is secured in position by means of the rivets or bolts 81. This clip holds plate 83' in position. The suction nozzles terminate in enlarged portions 84 which have openings 86 formed therein adjacent to the convex surface of the brush. Lips 85 are formed on the suction nozzles and these lips slidingly engage the housing 74. The positions of the suction nozzles are shown in Fig. 3 and it will be noted that the ends 84 of the suction nozzles engage each other so as to form practically a continuous sectional nozzle and are restrained against transverse movement by their engagement with each other, the outside nozzles engaging the side members 70. The suction nozzles are independently movable vertically about their pivots 81 so as to adapt themselves automatically to the street surface. The downward movement is however limited by means of suitable stops. These steps comprise rods 87 which are flexibly connected to the nozzles by suitable chains or springs 87' and these rods pass through lugs 86 attached to the housing 74. Nuts 88 on the rods 87 limit the downward movements of the rods 87. Each of the nozzles 80 is preferably provided with a cast iron shoe 89 so as to prevent wearing down of the nozzles themselves which are of comparatively thin sheet iron construction.

The rear brush frame and the nozzles are raised and lowered by suitable mechanism operated by means of a handle near the operator's seat. This mechanism comprises suitable links and levers 90, 91 and 92 connected to be operated by a handle or lever 93 placed near the operator's seat and locked in any adjusted position by means of a latch on the lever engaging suitable recesses on a sector 94.

The suction head 76 communicates with a discharge pipe 95 which discharges into a receptacle 97 at a point 96. A deflector in the form of an open cylinder 98 extends from the roof of the receptacle and is placed in front of the discharge opening 96 or slightly to one side thereof. A dome 100 is mounted upon the roof of the receptacle and has formed therein a plurality of openings 99 formed by the supports 99'. A partition 102 divides the receptacle into two parts and has formed therein an opening 101 directly beneath the cylinder 98. The receptacle is provided with a door 103 which is adapted to swing downwardly, as shown in Fig. 2. A suction fan 104 is mounted in the passage between the suction head 76 and the pipe 95 and is driven by means of a chain passing over the sprocket 105 of the fan shaft and a sprocket 106 on the shaft of a driving motor 107 which may be a motor of the internal combustion engine type.

The main shaft 68 driven from the road wheels 65 drives the rotary brush 72 which sweeps up the dust. The fan 104 creates a suction and the dust is taken from the brush and the street by means of the suction nozzles 80 and passes through the suction pipe 95 and is discharged into the receptacle 97. The blast of air and dust is discharged against the walls of the receptacle and deflector 98 and thus the dust will be thrown downwardly on the partition 102 and will find its way into the lower part of the receptacle through the aperture 101. The air however will pass up through the cylinder 98 and pass out through the apertures 99. The receptacle may be emptied at any time by opening the door 103 and the dust in the receptacle may be discharged into a wagon or the like. The pivotal connection between the brush frame and the axle 69 allows the brush to adjust itself automatically to the surface of the street and the independently movable suction nozzles also adapt themselves to the inequalities in the surface of the street. The entire rear brush frame and the suction nozzles may be raised clear from the surface of the street by means of the operating handle 93. In the preferred construction the fan 104 is driven by an internal combustion engine 107 but it will be obvious that other forms of motor or driving means may be employed.

By dividing the suction head 76 into a number of sections 78, and providing the adjustable plates 77', the suction in the nozzles may be regulated as desired.

A side brush frame 108 is pivoted on the axle 69 and has mounted thereon a rotary brush 109. This rotary brush is provided with a shaft 110 which is adapted to slide axially in its bearing on the frame 108. The shaft 110 has splined thereon a sprocket wheel 111 which is held against axial movement by the bearing lugs, as shown in Fig. 3, and a chain connects the sprocket 111 with a sprocket 112 on the main shaft 68. The bristles on the brush 109 are placed helically thereon. The side brush 109 is adapted to adjust itself to the curb line by means of the mounting of its shaft in its bearings and the helical construction of the bristles will always tend to move the brush outwardly yieldingly against the surface of the curb. The side brush will therefore pick up the dust nearest the curb and sweep it in the path of the rear dust collecting brush 72.

In the operation of this machine the coarse dirt will be picked up by the side brushes 27 and swept into the path of the rotary brush 36 which will deliver it to the elevator 42 and discharge it into the receptacle 58, the receptacle 58 being provided with a drop bottom if desired so that it may be emptied. The dust which is left by the brushes mounted at the front of the machine will be collected and picked up by the rotary brushes 72 and 109 and delivered to the suction nozzles which will discharge it into the receptacle 97. All of the brushes are so mounted that they adjust themselves automatically to the surface of the street and also to the curb line and therefore it is insured that the street will be thoroughly cleaned no matter how unequal the surface of the street may be or how unequal the curb line may be. All of the brushes may be raised from the surface of the street by means of the operating levers 56 and 93.

In the specific construction illustrated the machine is adapted to be moved by animal power, but it will be obvious to those skilled in the art that various changes may be made in the details of construction or in the manner of moving the machine, within the scope of the appended claims, and therefore it is to be understood that the invention is not limited to the specific constructions shown and described.

Having described my invention what I claim and desire to secure by Letters-Patent is, 1. In a street sweeper, the combination with a frame, of a pair of angularly disposed brushes pivotally mounted on said frame for movement toward and from each other, and means to yieldingly swing said brushes about their pivots comprising toggle links pivotally connected to said frame and brushes, and springs tending to straighten said links.

2. In a street sweeper, the combination with a frame, of a pair of angularly disposed brushes pivotally mounted on said frame for movement toward and from each other, and means to yieldingly swing said brushes about their pivots comprising toggle links pivotally connected to said frame and brushes, springs connecting said frame and said links and tending to straighten said links, and anti-friction rollers at the ends of said brushes.

3. In a street sweeper, the combination with a frame, of a brush frame, a pair of angularly disposed brushes mounted on said brush frame for movement toward and from each other, means yieldingly forcing said brushes apart, and a horizontal pivot on said frame about which said brush frame is freely movable so that the brushes may adjust themselves to the street surface.

4. In a street sweeper, the combination with a frame, of a brush frame mounted on a transverse axis on said first frame, a pair of angularly disposed brushes on said brush frame, a second brush frame mounted to swing about a transverse axis on said first frame, a rotary brush thereon positioned near the intersection of said angularly disposed brushes, and lever actuated means for raising said brush frames.

5. In a street sweeper, the combination with a frame, of a brush frame mounted on a transverse axis on said first frame, a pair of angularly disposed brushes on said brush frame, a second brush frame mounted to swing about a transverse axis on said first frame, an elevator pivoted on said first frame and connected to move with said second brush frame, a rotary brush on the second brush frame arranged to receive the dirt from the angularly disposed brushes and deliver it to the elevator, and lever actuated means for raising said brush frames and elevator.

6. In a street sweeper, the combination with a frame, of a rotary brush thereon, a housing for the brush, a suction pipe, and independently movable suction nozzles connecting said suction pipe with said brush housing, said nozzles being provided with lips engaging said housing.

7. In a street sweeper, the combination with a frame, of a suction pipe thereon, a suction head connected thereto, partitions dividing said suction head into sections, means for adjusting said partitions, and a suction nozzle connected to and discharging into each section.

8. In a street sweeper, the combination with a frame, of a suction pipe thereon, a suction head connected thereto, partitions dividing said suction head into sections, a suction nozzle connected to and discharging into each section, and means for varying the suction of each of said sections.

9. In a street sweeper, the combination with a frame, of a suction pipe thereon, a suction head connected to said pipe, partitions dividing said suction head into sections, sliding plates forming parts of said partitions whereby the relation of the partitions may be varied, and a suction nozzle connected to and discharging into each of said sections.

In testimony whereof I affix my signature in presence of two witnesses.

THOMAS R. KERR.

Witnesses:
A. C. LEGGETT,
H. M. KERR.